(12) United States Patent
Celik et al.

(10) Patent No.: US 10,864,772 B2
(45) Date of Patent: Dec. 15, 2020

(54) WHEEL FOR A SUPPORT STRUCTURE

(71) Applicant: The Goodyear Tire & Rubber Company, Akron, OH (US)

(72) Inventors: Ceyhan Celik, Stow, OH (US); Steven Amos Edwards, Akron, OH (US); George Michael Stoila, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 16/568,688

(22) Filed: Sep. 12, 2019

(65) Prior Publication Data
US 2020/0001648 A1    Jan. 2, 2020

Related U.S. Application Data

(62) Division of application No. 15/836,952, filed on Dec. 11, 2017, now Pat. No. 10,457,094.

(51) Int. Cl.
| | |
|---|---|
| *B60C 7/14* | (2006.01) |
| *B60B 25/12* | (2006.01) |
| *B60B 9/26* | (2006.01) |
| *B60B 3/16* | (2006.01) |
| *B60C 7/10* | (2006.01) |

(52) U.S. Cl.
CPC .............. *B60B 25/12* (2013.01); *B60B 3/16* (2013.01); *B60B 9/26* (2013.01); *B60C 7/14* (2013.01); *B60C 7/143* (2013.01); *B60B 2320/10* (2013.01); *B60C 2007/107* (2013.01); *B60C 2007/146* (2013.01)

(58) Field of Classification Search
CPC ..... B60C 7/143; B60C 7/14; Y10T 29/49481; Y10T 29/49494; Y10T 29/49524; Y10T 29/49526; Y10T 29/4954
See application file for complete search history.

(56) References Cited

U.S. PATENT DOCUMENTS

| | | |
|---|---|---|
| 479,255 A | 7/1892 | Dunlop |
| 482,175 A | 9/1892 | Hollafolla |
| 1,002,003 A | 8/1911 | Simonson et al. |
| 1,233,722 A | 7/1917 | Smith |
| 1,389,285 A | 8/1921 | Althoff |
| 1,451,517 A | 4/1923 | Smith |
| 1,930,764 A | 10/1933 | Mallory |
| 3,493,027 A | 2/1970 | Dewhirst et al. |
| 4,226,273 A | 10/1980 | Long et al. |
| 4,235,270 A | 11/1980 | Kahaner et al. |
| 4,602,823 A | 7/1986 | Berg |

(Continued)

*Primary Examiner* — Jason L Vaughan
*Assistant Examiner* — Amanda Kreiling
(74) *Attorney, Agent, or Firm* — Robert N. Lipcsik

(57) ABSTRACT

A wheel assembly includes a first side plate having a first annular base, axially protruding first claw members projecting axially outward from the first annular base, axially protruding first hub mounts projecting axially outward from the first annular base, and axially protruding first spring mounts projecting axially outward from the first annular base; a hub member attached to the first side plate; and a tire assembly laid over the hub member such that spokes of the tire assembly are radially adjacent corresponding first claw members of the first side plate, a plurality of friction members and the first claw members sandwiching each of the spokes.

10 Claims, 13 Drawing Sheets

(56) References Cited

U.S. PATENT DOCUMENTS

| | | | |
|---|---|---|---|
| 4,798,418 A * | 1/1989 | Kempf | B60B 21/021 |
| | | | 152/379.3 |
| 5,343,916 A | 9/1994 | Duddey et al. | |
| 5,800,643 A | 9/1998 | Frankowski | |
| 6,068,721 A | 5/2000 | Dyer et al. | |
| 6,260,598 B1 | 7/2001 | Tanaka | |
| 7,032,634 B2 | 4/2006 | Laurent et al. | |
| 8,962,120 B2 | 2/2015 | Delfino et al. | |
| 8,978,726 B2 * | 3/2015 | Detout | B60C 17/06 |
| | | | 152/520 |
| 2004/0069385 A1 | 4/2004 | Timoney et al. | |
| 2010/0193097 A1 | 8/2010 | McNier et al. | |
| 2012/0205017 A1 * | 8/2012 | Endicott | B60B 1/042 |
| | | | 152/1 |
| 2019/0176516 A1 | 6/2019 | Celik et al. | |

* cited by examiner

WHEEL FOR A SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

A wheel assembly in accordance with the present invention includes a first side plate having a first annular base, axially protruding first claw members projecting axially outward from the first annular base, axially protruding first hub mounts projecting axially outward from the first annular base, and axially protruding first spring mounts projecting axially outward from the first annular base; a hub member attached to the first side plate, the hub member including an annular center with a plurality of arms extending radially to a plurality of axially extending torque cylinders; a tire assembly laid over the hub member such that spokes of the tire assembly are radially adjacent corresponding first claw members of the first side plate, a plurality of friction members and the first claw members sandwiching each of the spokes as a first axial end of each friction member engages the first spring mounts of the first side plate; a second side plate having a second annular base, axially protruding second claw members projecting axially outward from the second annular base, axially protruding second hub mounts projecting axially outward from the second annular base, and axially protruding second spring mounts projecting axially outward from the second annular base, the second claw members receiving corresponding pins of the first claw members of the first side plate, a second axial end of each friction member engaging the second friction mounts of the second side plate; and a plurality of fasteners securing the hub member to both the first side plate and the second side plate and the tire assembly.

According to another aspect of the assembly, the plurality of fasteners extends through parts of the first side plate, the hub member, and the second side plate.

According to still another aspect of the assembly, the first claw members and second claw members are curved corresponding to a shape of the friction members.

According to yet another aspect of the assembly, the plurality of fasteners extends through the torque cylinders of the hub member.

According to still another aspect of the assembly, the plurality of fasteners extends through bore holes in the first side plate and bore holes in the second side plate.

According to yet another aspect of the assembly, the first claw members are welding to the first side plate.

According to still another aspect of the assembly, the first hub mounts are welded to the first side plate.

According to yet another aspect of the assembly, the first friction mounts are welded to the first side plate.

According to still another aspect of the assembly, the second hub mounts are constructed integrally with the second side plate.

According to yet another aspect of the assembly, the second claw members are constructed integrally with the second side plate.

A method in accordance with the present invention assembles a rim and a tire. The method comprises the steps of: projecting first claw members axially from a first annular base member; projecting first hub mounts axially from the first annular base member; projecting first spring mounts axially from the first annular base member; projecting second claw members axially from a second annular base member; projecting second hub mounts axially from the second annular base member; and projecting second spring mounts axially from the second annular base member.

According to another aspect of the method, further steps include: connecting a hub member to the first annular base; and extending a plurality of arms radially from a center member of the hub member.

According to still another aspect of the method, further steps include: extending a plurality of torque cylinders axially from each of the plurality of arms; and connecting first ends of the torque cylinders of the hub member to the first hub mounts of the first annular base.

According to yet another aspect of the method, further steps include: laying a tire over the hub member such that spokes of the tire are radially adjacent corresponding first claw members of the first annular base; and sandwiching the spokes of the tire assembly radially between the first claw members and corresponding friction members.

According to still another aspect of the method, further steps include: connecting the first claw members of the first annular base to second claw members of a second annular base; and connecting second hub mounts of the second annular base to second opposite ends of the torque cylinders of the hub member.

According to yet another aspect of the method, a further step includes connecting friction members to the second friction mounts of the second annular base.

According to still another aspect of the method, further steps include inserting a plurality of fasteners through first bore holes of the first annular base, bore holes of the hub member, and second bore holes of the second annular base; and securing corresponding nuts to the fasteners proximate the second annular base.

According to yet another aspect of the method, a further step includes welding the first claw members to the first annular base.

According to still another aspect of the method, a further step includes welding the first hub mounts to the first annular base.

According to yet another aspect of the method, a further step includes constructing the second annular base, the second claw members, and the second hub mounts as a single integral piece.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional tire assembly, such as that described in US 2004/0069385 and U.S. patent application Ser. No. 15/615,888, incorporated herein by reference in their entirety, may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

Figure 12:
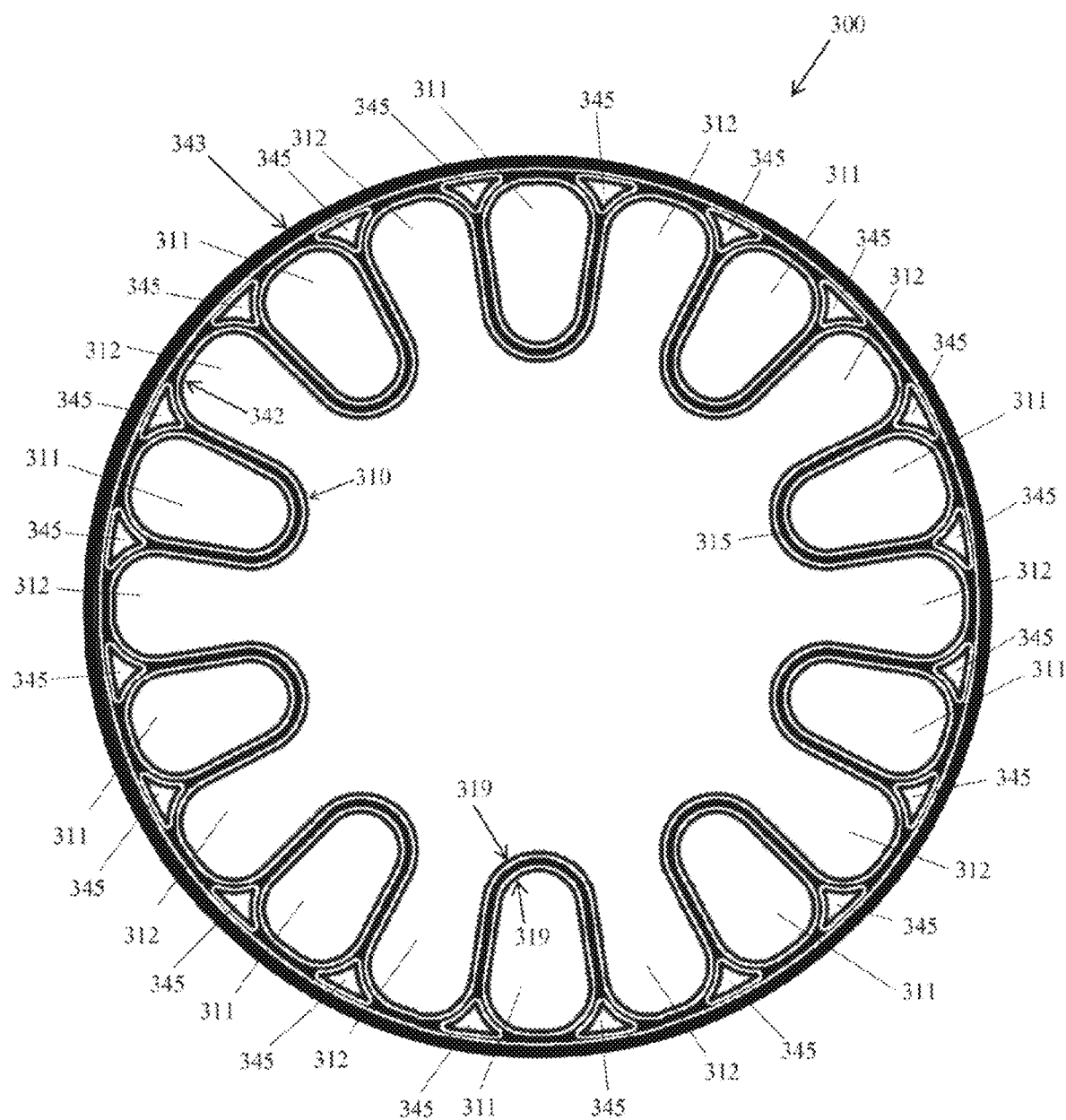
FIG. 12 is a schematic elevation view of an example tire for use with the example assembly of FIGS. 1-11.

As shown in FIG. 12, an example tire assembly 300 for use with a rim in accordance with the present invention may have a spoke structure 310 defining a plurality of alternating closed egg-shaped cavities 311 and open rectangular inlet openings 312 disposed concentrically about the inner central rim allowing the spoke structure to deflect under load thereby defining a suitable balance between flexibility for ride comfort and traction within a footprint of the assembly 300 and stiffness for vehicle handling, low rolling resistance, and low heat build-up within the spoke structure. The spoke structure 310 may further define a plurality of triangular openings 345 disposed at the outer flexible ring and between the cavities 311 and the inlet openings 312 (FIG. 12).

The cavities 311 of the spoke structure 310 may further define openings for arms of an inner central rim to extend therethrough and secure the spoke structure to the inner central rim, as described above. The arms may engage portions of the spoke structure 310 in a mechanical interlocking arrangement. The inner central rim may further include plates that, along with the arms may sandwich portions of the spoke structure 310 and create a further frictional and/or adhesive securement between the inner central rim and the spoke structure. The spoke structure 310 may comprise a homogenous or heterogeneous polymer and/or a filled polymer.

Spokes 315 of the spoke structure 310 may be curved inwardly or outwardly for mitigating or enhancing buckling of the spokes. The spokes 315 may include one or more reinforcing layers 319. The layer(s) 319 may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be between 400 denier to 9000 denier. The polymeric film may be from 0.1 mm to 2.0 mm thick. The reinforcement in the spokes 315 may be oriented at angle between 0 degrees and 90 degrees. The spokes 315 may be continuously reinforced across their entire axial length. Continuous reinforcement layer(s) 319 may extend radially outward to multiple locations adjacent to a shear band 343 at the outer flexible ring. Other reinforcement layers 319 may extend about the interior of the closed cavities 311. The continuous reinforcement layer(s) 319 may be integrated into the spoke structure 310 and the outer flexible ring. Alternatively, the shear band 343 may be attached to the spoke structure 310 by between 20 and 60 connection points (e.g., cohesion, adhesive, fused, welded, etc.).

Each cavity 311 and inlet opening 312 may have a common cross sectional profile about the axis of rotation of the assembly. Further, each cavity 311 and inlet opening 312 may have a common axial length equal to a uniform axial thickness of the spoke structure 310. Each cavity 311 may be curvedly shaped to prevent "pinch" points on the reinforcement layer(s) 319 and mitigate compressive stress concentrations on the reinforcement layer(s). The number of cavities 311 may be between 15 and 60 for large scale assemblies.

As shown in FIGS. 1-11, a rim assembly 200 in accordance with the present invention may include a first side plate 210 having a first annular base 211, axially protruding first claw members 212 (10 shown in FIGS. 1-3) projecting axially outward from the first base, axially protruding first hub mounts 214 (10 partially shown in FIGS. 1-3) projecting axially outward from the first base, and axially protruding first spring mounts 216 (20 partially shown in FIGS. 1-3) projecting axially outward from the first base. The first claw members 212 may have axially extending pins 213 for engaging another part of the rim assembly 200. The first hub mounts 214 may include first bore holes 215 extending axially through both the first hub mounts and the first annular base 211 for engaging another part of the rim assembly 200. The first side plate 210 and its parts 211, 212, 213, 214, 216 may be constructed as a single, monolithic and integral piece or assembled, such as by welding, and/or in any combination thereof.

Figure 1:
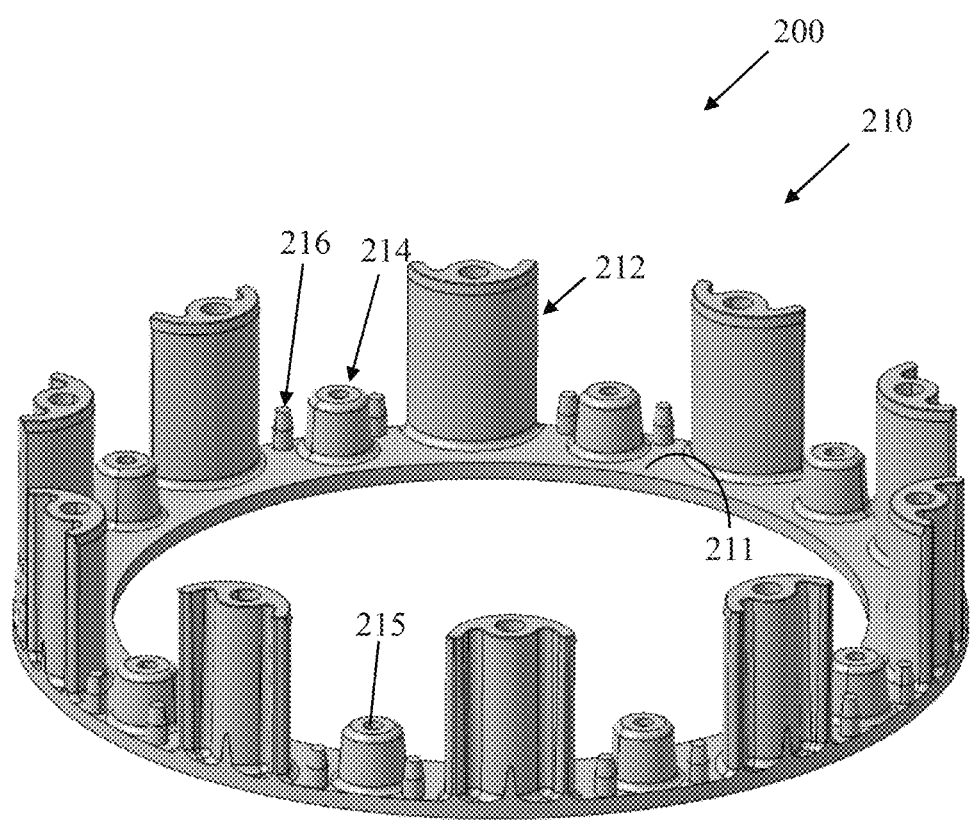
FIG. 1 is a schematic perspective view of part of an example wheel assembly in accordance with the present invention.
Figure 2:
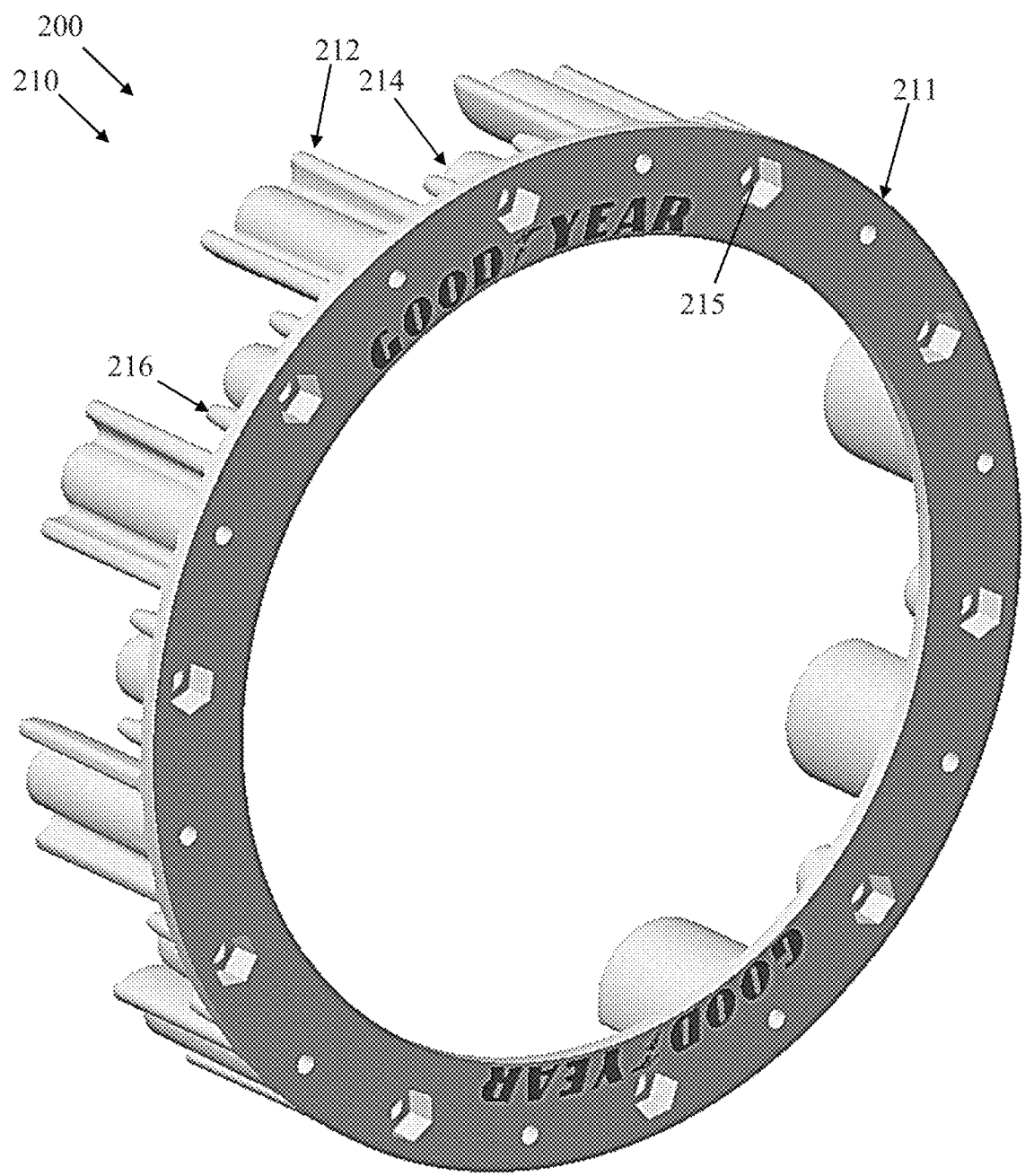
FIG. 2 is another schematic perspective view of the part of FIG. 1.
Figure 3:
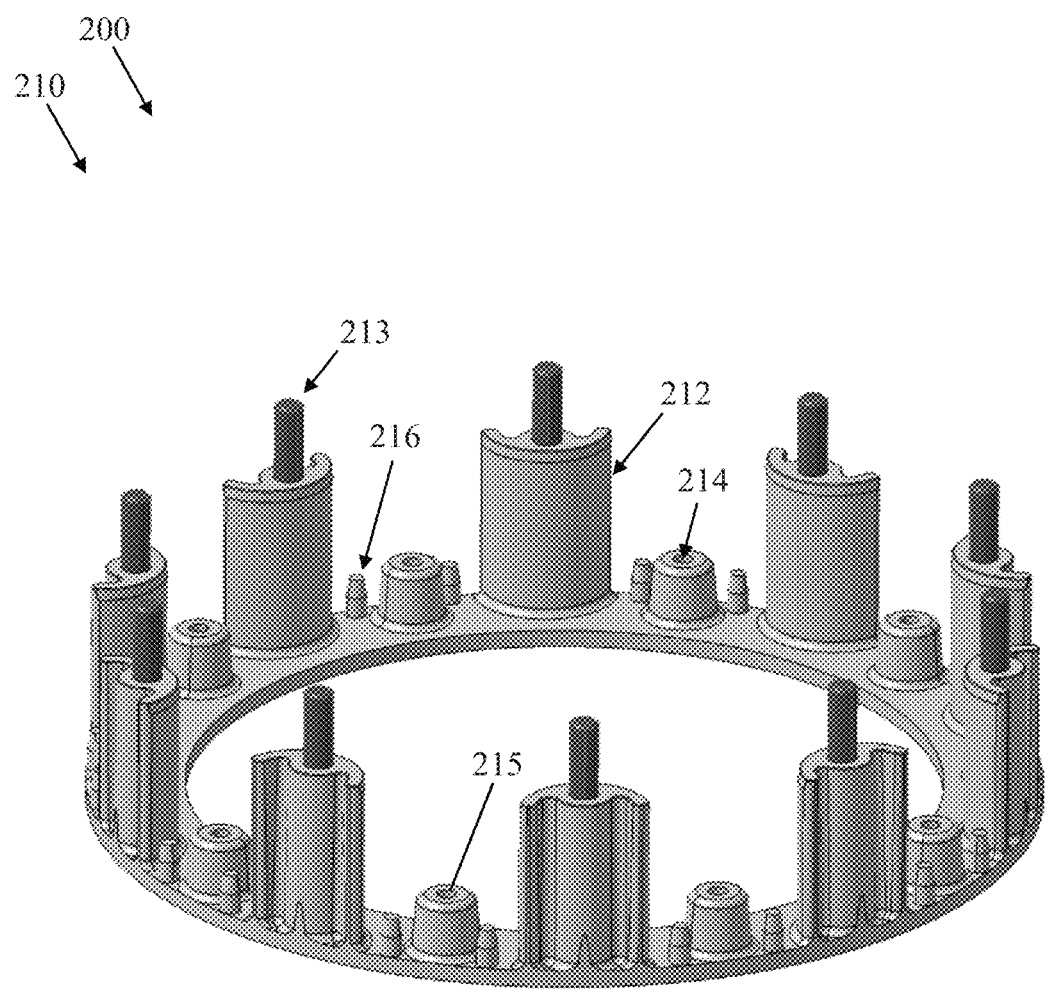
FIG. 3 is a schematic perspective view of the part of FIG. 1 and another part of the example wheel assembly.
Figure 4:
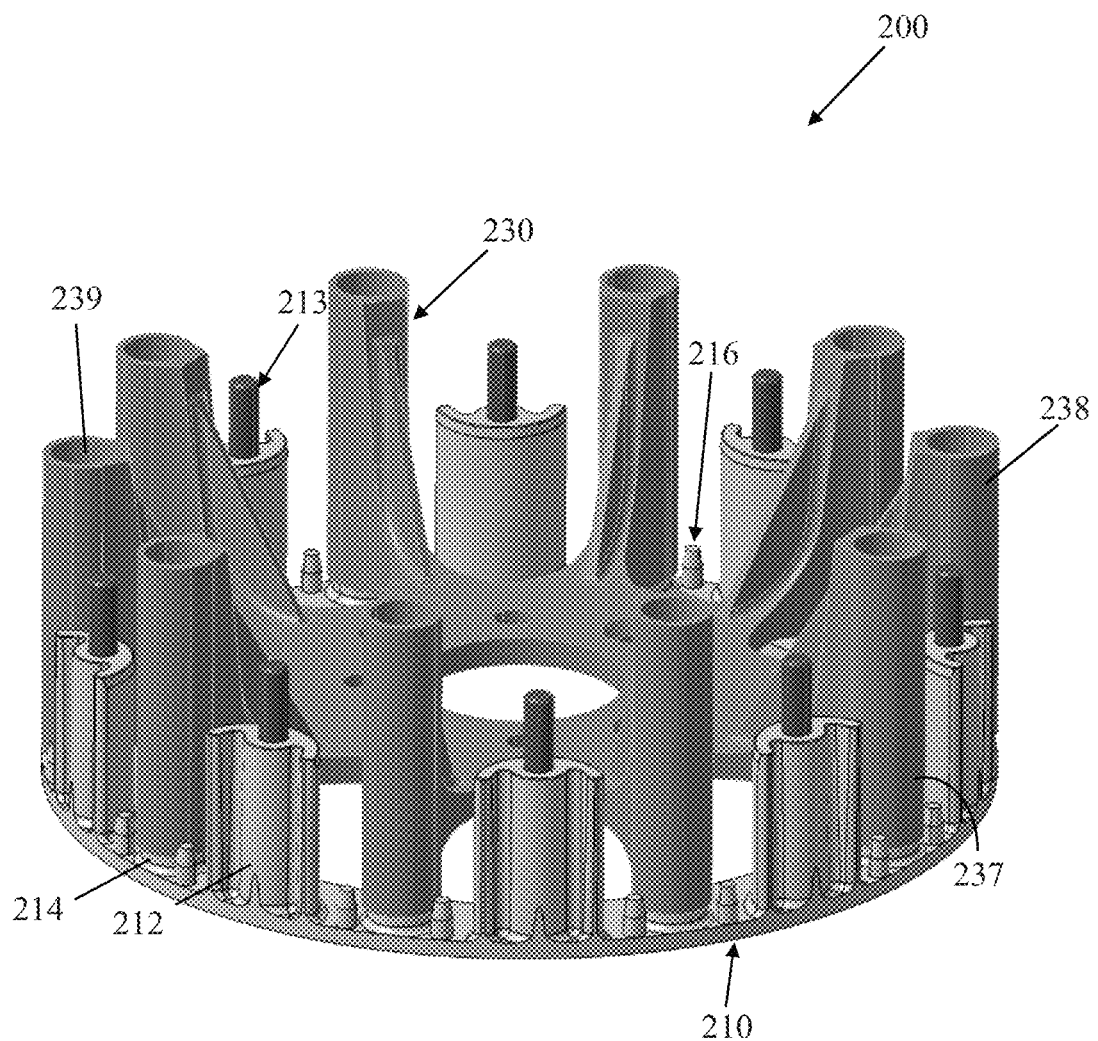
FIG. 4 is a schematic perspective view of the parts of FIG. 3 and another part of the example wheel assembly.
Figure 5:
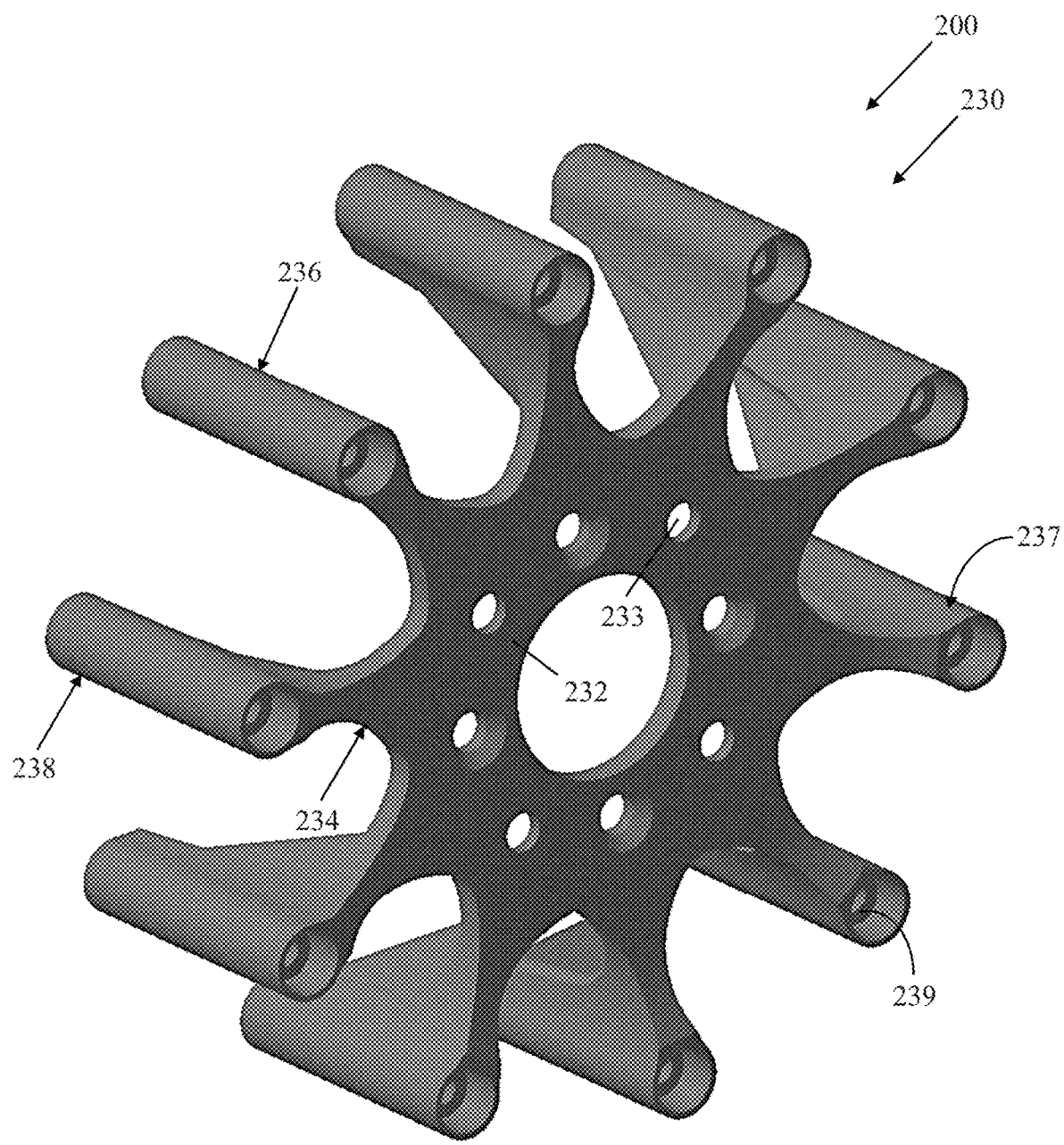
FIG. 5 is a schematic perspective view of one of the parts of FIG. 4.

The rim assembly 200 may further include a hub member 230 attached to the side plate 210. The hub member 230 may include an annular center 232 with a plurality of arms 234 extending radially to a plurality of axially extending torque cylinders 236 (10 shown in FIGS. 4-5). The annular center 232 may include bore holes 233 for rotational attachment to a vehicle (10 shown in FIG. 5). Each torque cylinder 236 may have a first cylindrical end 237 and a second opposite cylindrical end 238 and axially extending torque holes 239 interconnecting the first and second ends. The 10 first cylindrical ends 237 may attach to the corresponding 10 first hub mounts 214 of the first side plate 210 (FIG. 4). The hub member 230 and its parts 232, 234, 236 may be constructed as a single, monolithic piece or assembled, such as by welding. As shown in FIG. 5, the arms 234 and the torque cylinders 236 may be attached to the annular center 232 at a location axially nearer the first cylindrical ends 237 than the second cylindrical ends 238.

Figure 6:
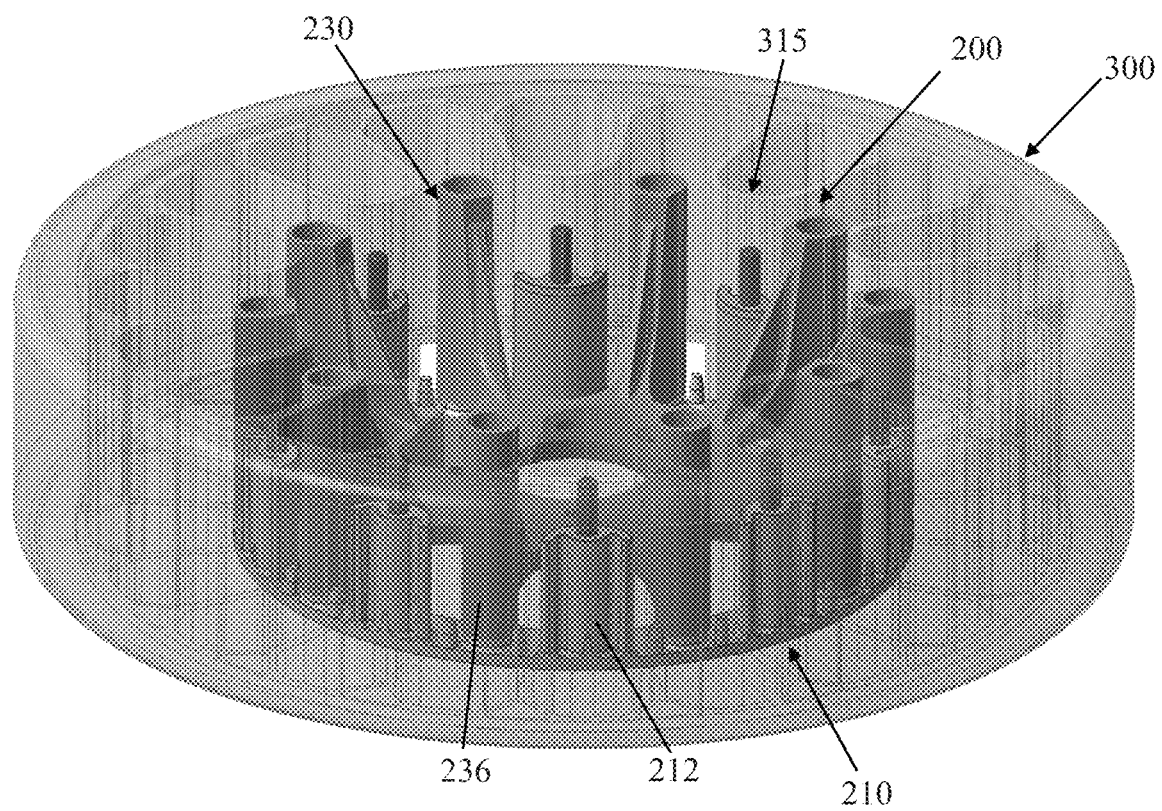
FIG. 6 is a schematic perspective view of the parts of FIG. 4 and a part of an example tire assembly.
Figure 7:
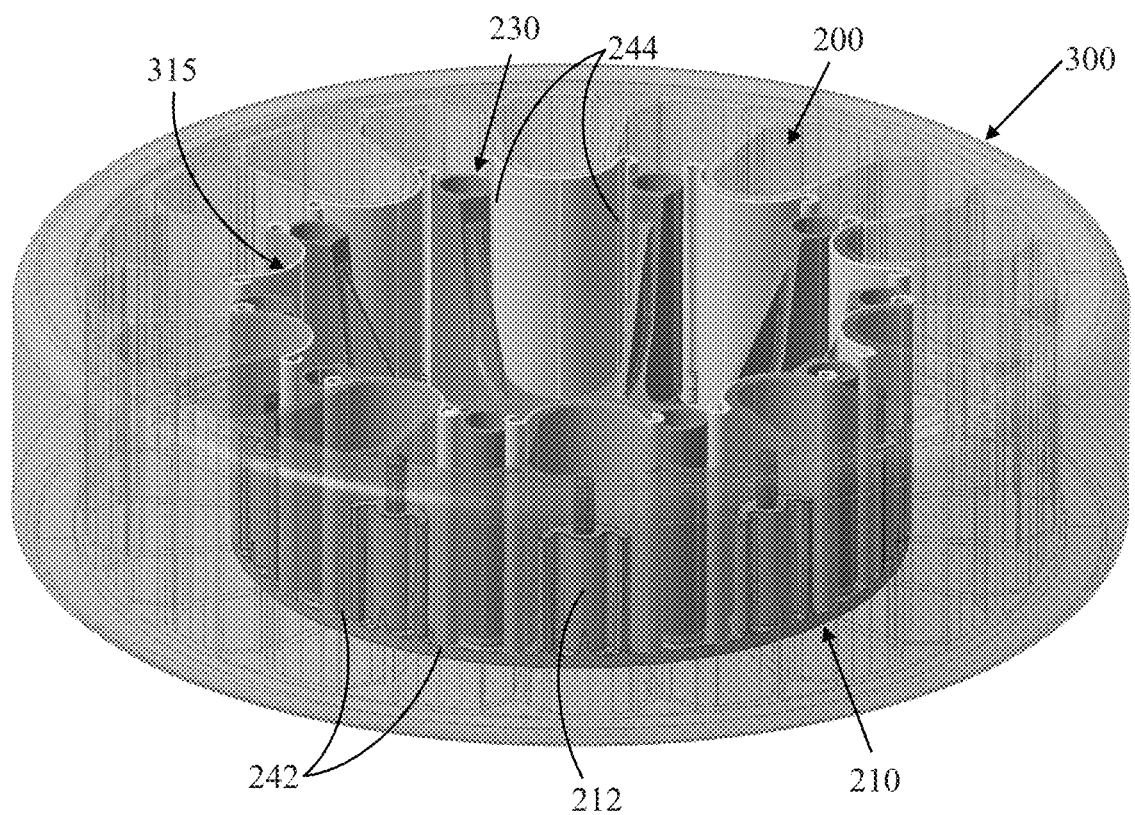
FIG. 7 is a schematic perspective view of the parts of FIG. 5 and another part of the example wheel assembly.

A tire assembly, similar to the tire assembly 300 described above, may be laid over the side plate/hub member assembly 210, 230 with an equal number of curved spokes 315 of the tire assembly 300 being radially adjacent the correspondingly curved first claw members 212 of the first side plate 210 (10 shown in FIG. 6). The flexible spokes 315 may be deflected/stretched as necessary such that each of the spokes 315 of the tire assembly 300 are disposed radially inside the claw members 212 (FIG. 6). A plurality of correspondingly curved friction members 240, with the first claw members 212, may then partially sandwich each of the spokes 315 as a first end 242 of each friction member engages the first spring mounts 216 of the first side plate 210 (FIG. 7).

The rim assembly 200 may further include a second side plate 220 having a second annular base, axially protruding first claw members 222 (10 partially shown in FIG. 8) projecting axially outward from the second base, axially protruding second hub mounts (10 partially shown in FIG. 8) projecting axially outward from the second base, and axially protruding second spring mounts projecting axially outward from the second base. The second claw members 222 may have bore holes for receiving the corresponding pins 213 of the claw members 212 of the first side plate 210. The second hub mounts of the second side plate 220 may correspondingly align with the second cylindrical ends 238 of the torque cylinders 236 of the hub member 230. The second side plate 220 may be identical to the first side plate 210 except for lacking the pins 213. The second side plate 220 and its parts 222 may be constructed as a single, monolithic and integral piece or assembled, such as by welding, and/or in any combination thereof.

Figure 8:
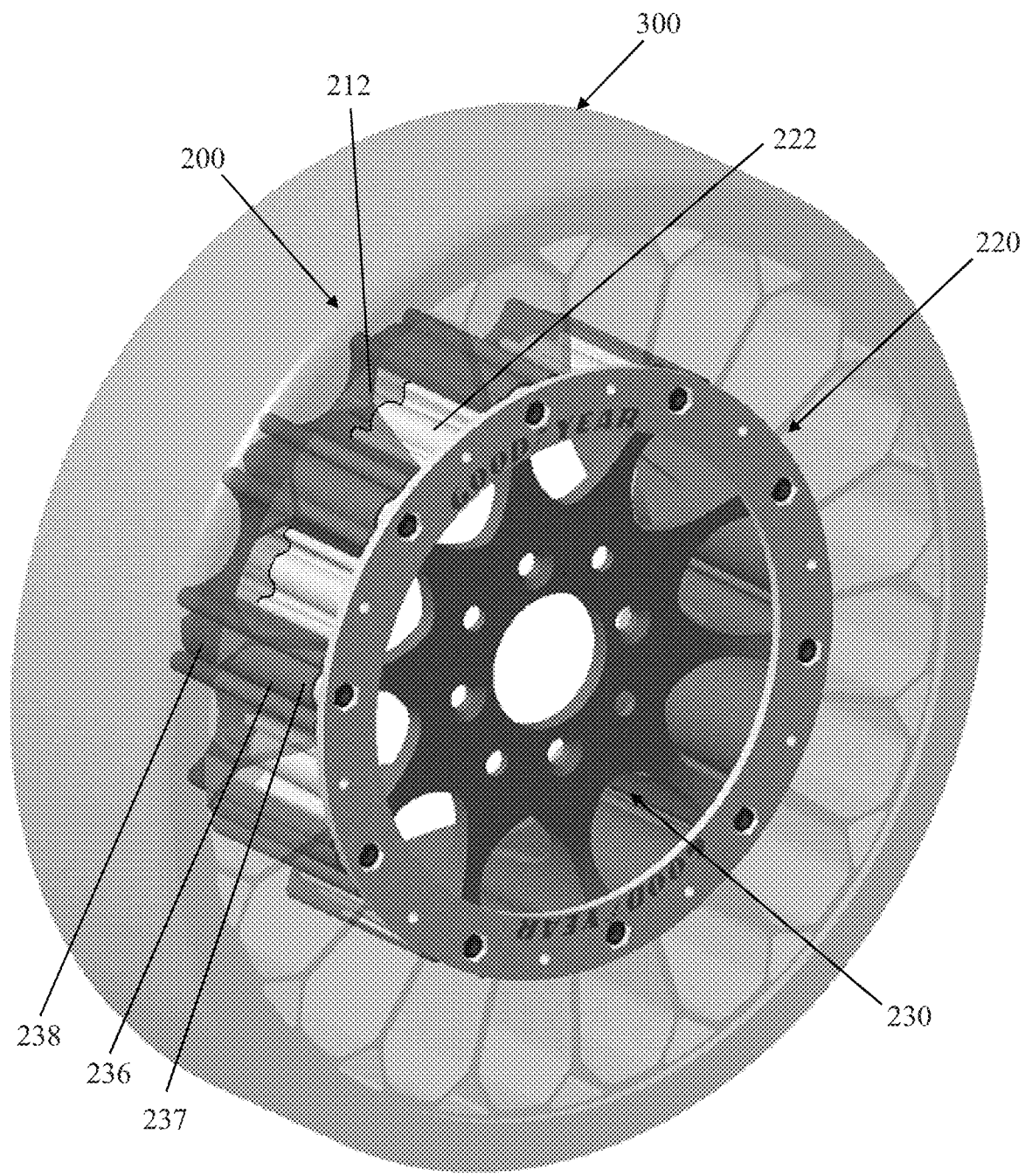
FIG. 8 is a schematic perspective view of the parts of FIG. 7 and another part of the example wheel assembly.
Figure 9:
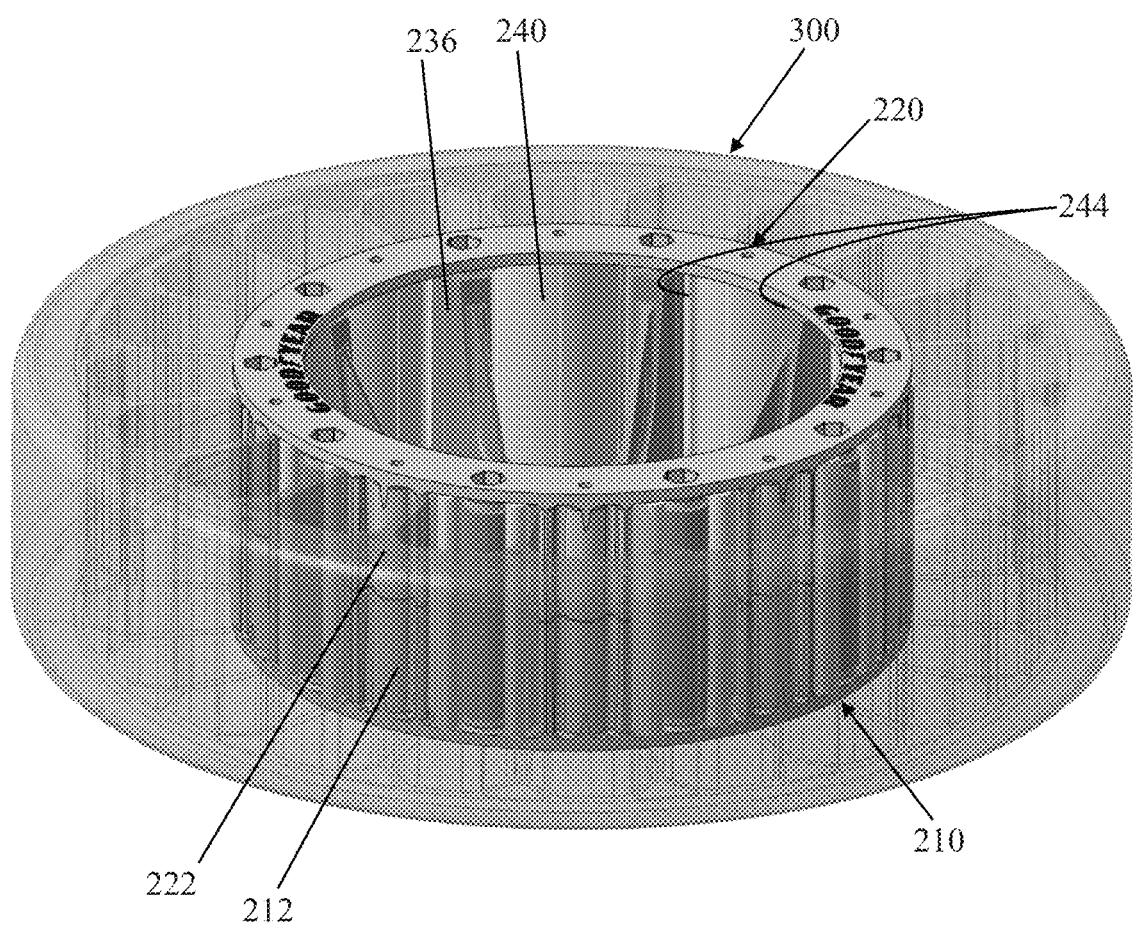
FIG. 9 is a schematic perspective view of the parts of FIG. 8 and another part of the example wheel assembly.

The second side plate 220 may be laid over the side plate/hub member/tire assembly 210, 230, 300. The second claw members 222 may be aligned with the first claw members 212 of the first side plate 210 and interconnected by the pins 213 of the first claw members. A second end 244 of each curved friction member 240 may also be aligned to engage the second friction mounts of the second side plate 220. Again, the flexible spokes 315 may be deflected/stretched as necessary such that each of the spokes 315 of the tire assembly 300 are disposed radially inside the first claw members 212 and the second claw members 222 (FIGS. 8-9).

Figure 10:
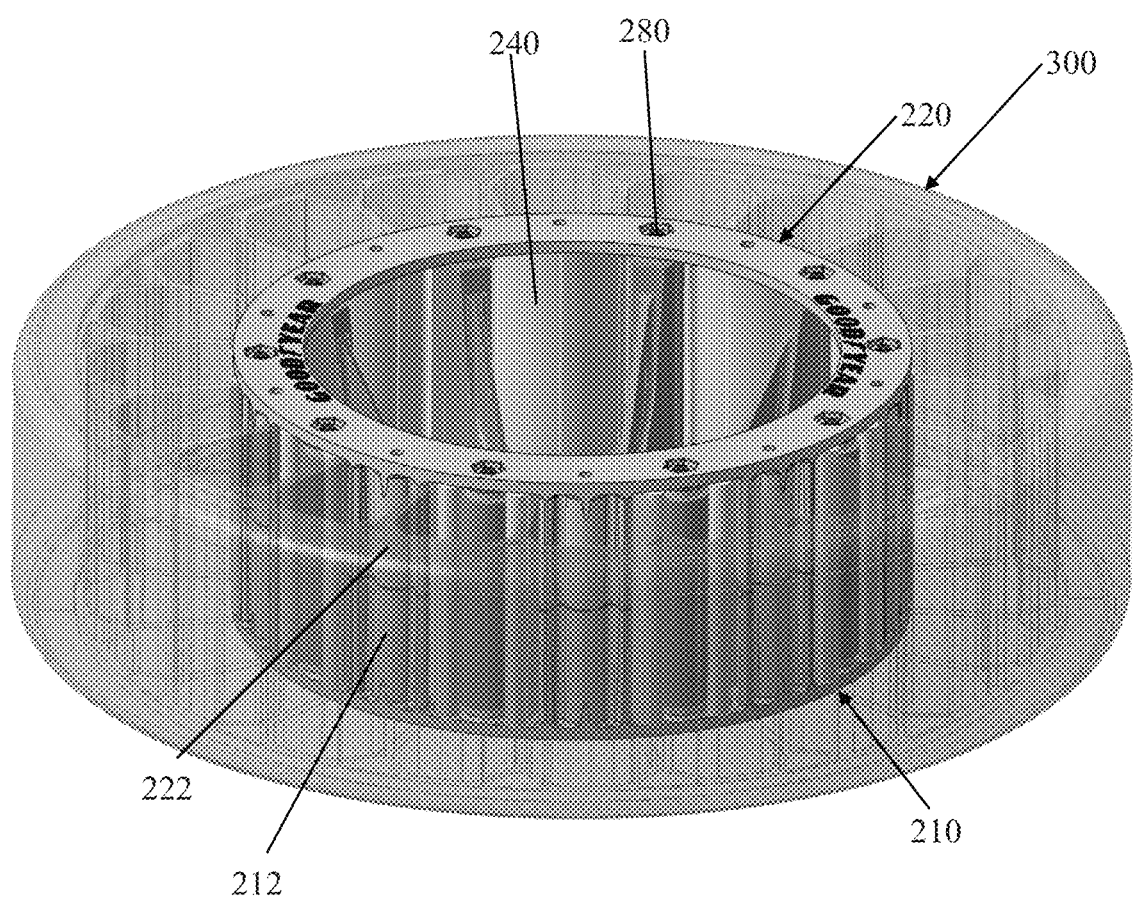
FIG. 10 is a schematic perspective view of the parts of FIG. 9 and another part of the example wheel assembly.
Figure 11:
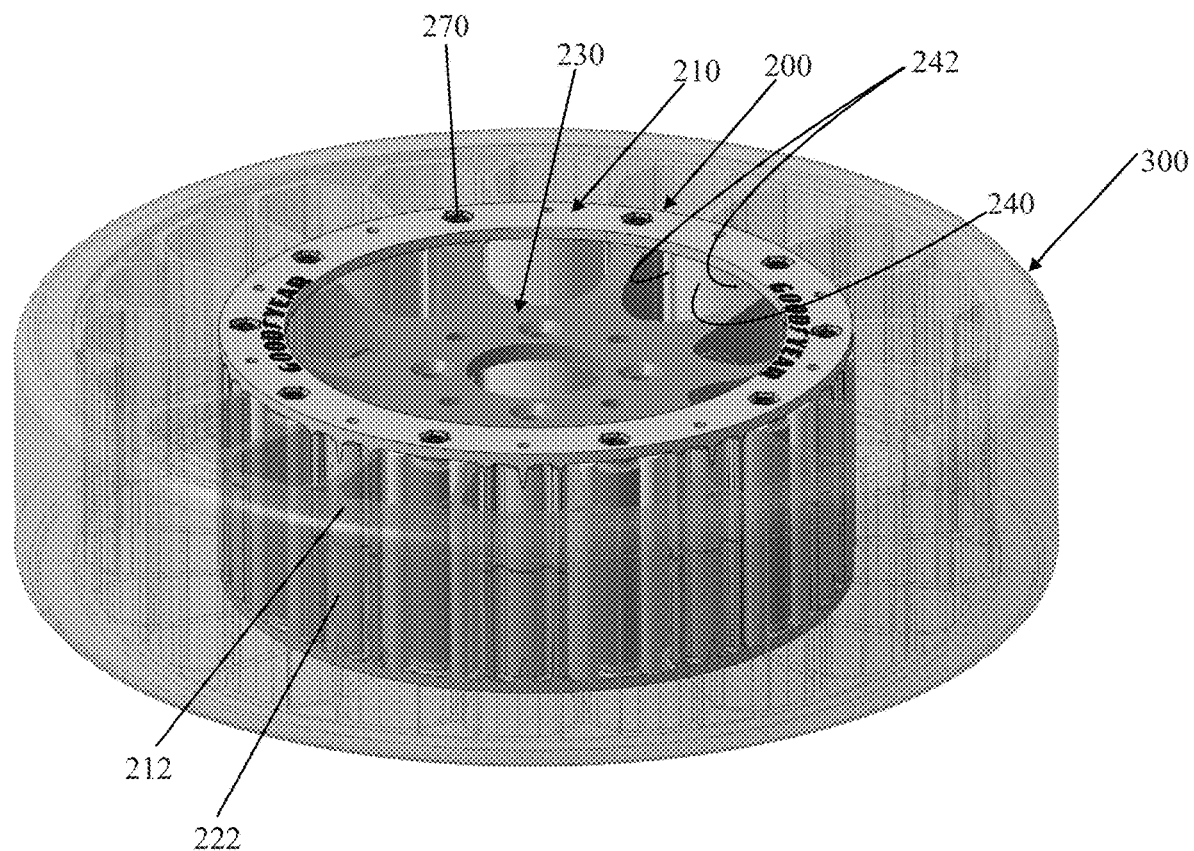
FIG. 11 is another schematic perspective view of the parts of FIG. 10.

A plurality of bolts 270, or other suitable fasteners, may be inserted through may be inserted through the first bore holes 215 of the first side plate 210, the bore holes 239 of the hub member 230, and second bore holes of the second side plate 220 (FIG. 11). Corresponding nuts 280, or other suitable fasteners, may be secured to the bolts 270 at the second side plate 220 (FIG. 10). The entire rim assembly 200 is now secured to the tire assembly 300 and may be attached to a vehicle at the bore holes 233 of the hub member 230.

Figure 13:
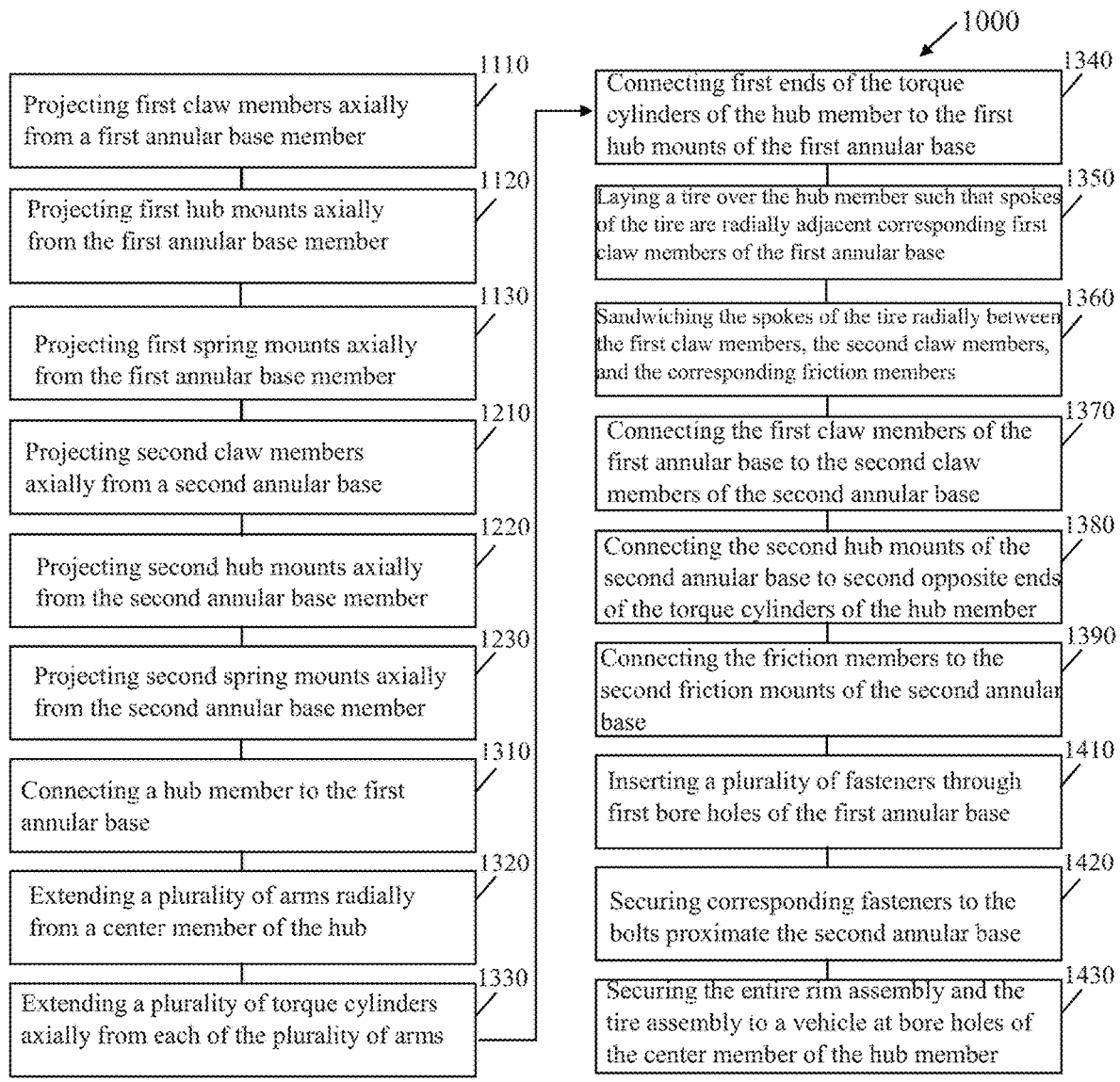
FIG. 13 is a schematic flow chart of a method in accordance with the present invention.

As shown in FIG. 13, a method 1000 for assembling a rim and a tire, such as the rim and tire assemblies 200, 300, in accordance with the present invention, may include the steps of: projecting 1110 first claw members axially from a first annular base member; projecting 1120 first hub mounts axially from the first annular base member; projecting 1130 first spring mounts axially from the first annular base member; projecting 1210 second claw members axially from a second annular base member; projecting 1220 second hub mounts axially from the second annular base member; and projecting 1230 second spring mounts axially from the second annular base member;

The method 1000 may further include the steps of: connecting 1310 a hub member to the first annular base; extending 1320 a plurality of arms radially from a center member of the hub member; extending 1330 a plurality of torque cylinders axially from each of the plurality of arms; connecting 1340 first ends of the torque cylinders of the hub member to the first hub mounts of the first annular base; laying 1350 a tire over the hub member such that spokes of the tire are radially adjacent corresponding first claw members of the first annular base; sandwiching 1360 the spokes of the tire assembly radially between the first claw members, the second claw members, and corresponding friction members; connecting 1370 first claw members of the first annular base to the second claw members of the second annular base; connecting 1380 the second hub mounts of the second annular base to second opposite ends of the torque cylinders of the hub member; and connecting 1390 the friction members to the second friction mounts of the second annular base.

The method 1000 may further include the steps of: inserting 1410 a plurality of bolts, or other suitable fasteners, through first bore holes of the first annular base, bore holes of the hub member, and second bore holes of the second annular base; securing 1420 corresponding nuts, or other suitable fasteners, the bolts proximate the second annular base; and securing 1430 the entire rim assembly and the tire assembly to a vehicle at bore holes of the center member of the hub member.

Variations in the present invention are possible in light of the description of it provided herein. While certain representative examples and details have been shown for the purpose of illustrating the subject invention, it will be apparent to those skilled in this art that various changes and modifications can be made therein without departing from the scope of the subject invention. It is, therefore, to be understood that changes can be made in the particular examples described which will be within the full scope of the present invention as defined by the following appended claims. Further, the present invention is not limited to the examples hereinbefore described which may be varied in both construction and detail within the full scope of the appended claims.

What is claimed:

1. A method for assembling a rim and a tire, the method comprising the steps of: using a rim assembly that includes first claw members projecting axially from a first annular base member; first hub mounts projecting axially from the first annular base member; first spring mounts projecting axially from the first annular base member; second claw members projecting axially from a second annular base member; second hub mounts projecting axially from the second annular base member; and second spring mounts projecting axially from the second annular base member; to assemble the rim to the tire.

2. The method as set forth in claim 1 further including the steps of: connecting a hub member to the first annular base; and extending a plurality of arms radially from a center member of the hub member.

3. The method as set forth in claim 1 further including the steps of:
   extending a plurality of torque cylinders axially from each of the plurality of arms; and
   connecting first ends of the torque cylinders of the hub member to the first hub mounts of the first annular base.

4. The method as set forth in claim 1 further including the steps of:
   laying a tire over the hub member such that spokes of the tire are radially adjacent corresponding first claw members of the first annular base; and
   sandwiching the spokes of the tire assembly radially between the first claw members and corresponding friction members.

5. The method as set forth in claim 1 further including the steps of:
   connecting the first claw members of the first annular base to second claw members of a second annular base; and
   connecting second hub mounts of the second annular base to second opposite ends of the torque cylinders of the hub member.

6. The method as set forth in claim 1 further including the step of connecting friction members to the second friction mounts of the second annular base.

7. The method as set forth in claim 1 further including the steps of:
   inserting a plurality of fasteners through first bore holes of the first annular base, bore holes of the hub member, and
   second bore holes of the second annular base; and securing corresponding nuts to the fasteners proximate the second annular base.

8. The method as set forth in claim 1 further including the step of welding the first claw members to the first annular base.

9. The method as set forth in claim 1 further including the step of welding the first hub mounts to the first annular base.

10. The method as set forth in claim 1 further including the step of constructing the second annular base, the second claw members, and the second hub mounts as a single integral piece.

* * * * *